United States Patent Office 2,851,136
Patented Sept. 9, 1958

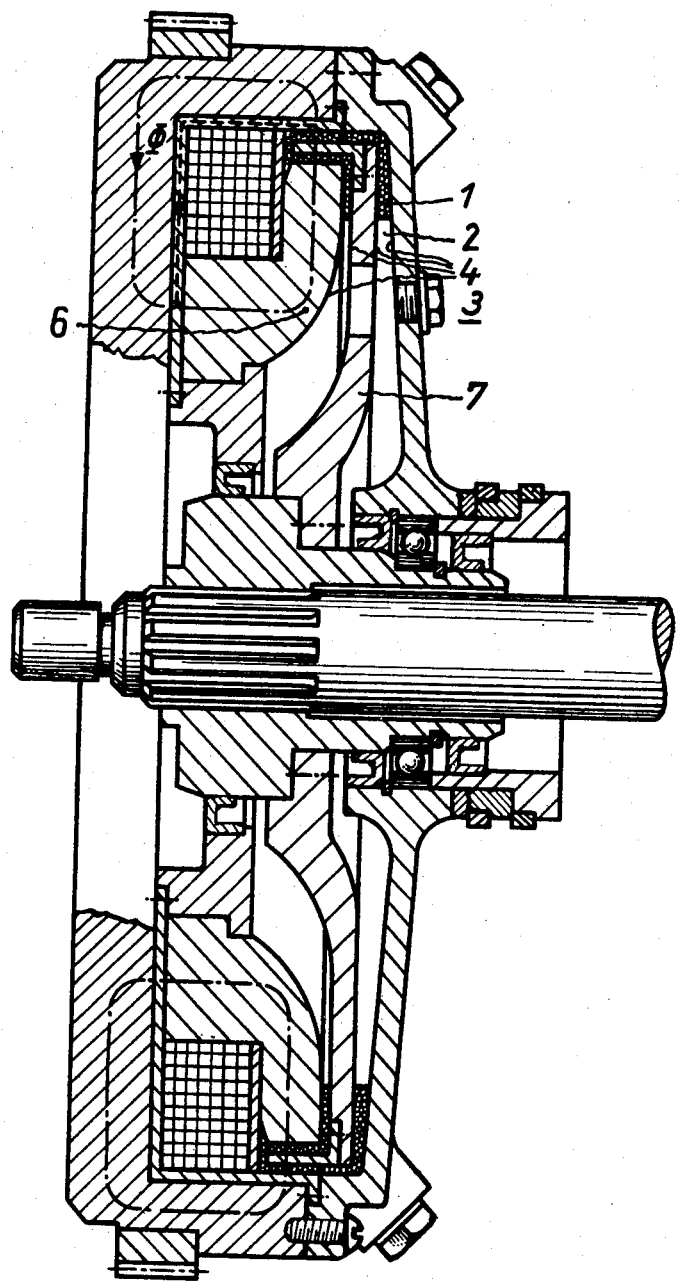

2,851,136

MAGNETIC FLUID MIXTURE CLUTCH

Walter Sussebach and Herbert Falderbaum, Olpe, Germany, assignors to Elektro Mechanik G. m. b. H., Wendenerhutte uber Olpe, Germany Application December 7, 1954, Serial No. 473,677

1 Claim. (Cl. 192—21.5)

The present invention relates to a magnetic agent, an alloy, and an operating device containing said magnetic agent. More particularly, the present invention relates to a free flowing magnetizable agent having substantially permanent characteristics of magnetizability.

Magnetizable fluids consisting of iron carbonyl powder with or without a carrier, like oil or graphite, are used for the transmission of braking and clutch momenta. In operation the magnetizable fluids are stiffened under the influence of a magnetic field either to an extent permitting transmission of clutch and braking momenta or so as to effect a blocking action.

The disadvantages of these known devices are mainly that over prolonged periods of use the magnetic properties of the fluid tend to change and that consequently the application of equal amounts of magnetic force does not necessarily have the same effect at all times.

Chemical and mechanical changes occur in the magnetic fluid and its carrier materials. Non-magnetizable substances are present and the amount of these non-magnetizable substances increases due to the chemical and mechanical changes in the magnetic fluid. The known devices do not prevent formation of graphite, the rubbing off of materials from the housing and operating parts of the machinery which contains the magnetic fluid, prolonged idleness tends to increase the aging process of the carrier material, and consequently it is extremely difficult to provide regulating devices which by adjusting the amount of magnetic force exactly control the operation of the magnetic brake or clutch.

It is therefore an object of the present invention to provide a free flowing magnetizable agent which overcomes the aforementioned disadvantages.

It is a further object of the present invention to provide an operating device in combination with a magnetic fluid which overcomes the aforementioned disadvantages.

It is still another object of the present invention to provide an alloy from which the magnetic fluid capable of overcoming the aforementioned disadvantages may be produced.

It is also an object of the present invention to provide a magnetic fluid which will not be subject to an aging process and the reaction of which to a given magnetic force will not change.

It is yet another object of the present invention to provide a magnetic fluid which remains free flowing for an indefinite period of time while not under the influence of a magnetic force.

It is still a further object of the present invention to provide a magnetic fluid which will retain the aforementioned advantages even after prolonged idleness.

Other objects and advantages of the present invention will become apparent from the following description and the appended claim.

With the above objects in view the present invention mainly consists of a free flowing magnetizable agent, consisting essentially of a mass of substantially spherical particles containing at least 99.2% pure magnetizable iron and being substantially free of carbon and nitrogen.

The present invention also relates to an operating device comprising in part a magnetic fluid consisting essentially of a mass of substantially spherical free flowing solid particles containing at least 99.2% pure magnetizable iron substantially free of non-magnetizable substances, and wall means forming a chamber containing the magnetic fluid, the wall means consisting of a material incapable of releasing substances adapted to reduce the magnetizability and flowability of the magnetic mass.

The present invention also relates to an iron alloy having substantially permanent characteristics of magnetizability, the alloy consisting essentially of less than 0.1% carbon, less than 0.3% silicon, between 0.3% and 0.1% manganese, less than 0.03% phosphorus, less than 0.03% sulfur and the remainder iron.

In accordance with the present invention the size of the spherical particles comprising the magnetic fluid is so chosen that forces acting on the surface of the particles, as for instance magnetic field, remanence, capillary action, centrifugal force and the like do not result in any appreciable change in the flowability of the magnetic fluid and consequently an undesirable increase or decrease of the transmitted forces is avoided.

The present invention provides for the particles of the magnetic fluid to be made of an alloy coming rather close to being pure iron. The carbon content is kept very low so as to avoid carbide formation. The nitrogen content is kept as close to zero as possible. The silicon content is so chosen as to be just sufficient to precipitate the carbon as graphite, however sufficiently high to achieve a satisfactory abrasive strength.

In accordance with the present invention the admixture of any non-magnetizable material is avoided.

It is also within the scope of the present invention to make all parts of the operating device which may come in contact with the magnetic fluid, of materials which are incapable of releasing substances which may reduce the magnetizability or flowability of the magnetic fluid.

In a preferred embodiment the present invention provides for a difference between the hardness of the particles of the magnetic fluid and the hardness of the parts of the operating device which may come in contact with the magnetic fluid.

The adoption of the concepts of the present invention as described above results in a surprising and highly advantageous improvement of the magnetic fluid. Operating devices and magnetic fluids according to the present invention may be used for indefinite periods of time and may be exposed to a very great number of clutching or braking actions without showing any disadvantageous change in the magnetic characteristics of the magnetic fluid. In actual tests of heavy machinery magnetic clutches according to the present invention were used in up to 75,000 starting actions under heavy load without changing their magnetic characteristics. The forces acting on the clutch or brake are also maintained together with the magnetic characteristics without disadvantageous changes, and this is especially important when the operating device is used for regulating purposes.

Furthermore the magnetic fluids according to the present invention are distinguished by their great resistance against changes due to aging. Consequently, magnetic clutches, brakes or similar operating devices using the magnetic fluids of the present invention may be kept in operation for years even under heavy duty without requiring replacement of the magnetic fluid. A further advantage is the well maintained constancy of flowability. Because of the constancy of flowability of magnetic fluids according to the present invention, complete dependability in service is maintained even in operative devices which remain idle for prolonged periods of time such as for instance threshing machines and the like.

Depending on the particular requirements the spherical particles of the magnetic fluid in accordance with the present invention have a diameter of approximately between 0.15 and 0.8 mm. A preferred range of diameters for these particles is from 0.2 to 0.4 mm. and in the preferred embodiment the diameter is approximately 0.3 mm.

The particles of the magnetic fluid according to the present invention contain at least 99.2% iron and have a content of less than 0.1% carbon, less than 0.3% silicon, between 0.3% and 0.1% manganese, less than 0.03% phosphorous and less than 0.03% sulfur.

The following examples of the composition of magnetizable iron alloys are characteristic of the present invention and of the composition of the magnetic fluid according to the present invention, the invention not however being limited to the exact compositions described in the examples.

*Example 1*

| | Percent |
|---|---|
| Carbon | 0.01 |
| Silicon | 0.07 |
| Manganese | 0.15 |
| Phosphorus | 0.02 |
| Sulfur | 0.015 |
| Iron | balance |

*Example 2*

| | |
|---|---|
| Carbon | 0.02 |
| Silicon | 0.07 |
| Manganese | 0.15 |
| Phosphorus | 0.02 |
| Sulfur | 0.015 |
| Iron | balance |

*Example 3*

| | |
|---|---|
| Carbon | 0.03 |
| Silicon | 0.07 |
| Manganese | 0.15 |
| Phosphorus | 0.02 |
| Sulfur | 0.015 |
| Iron | balance |

*Example 4*

| | |
|---|---|
| Carbon | 0.04 |
| Silicon | 0.07 |
| Manganese | 0.15 |
| Phosphorus | 0.02 |
| Sulfur | 0.015 |
| Iron | balance |

*Example 5*

| | |
|---|---|
| Carbon | 0.06 |
| Silicon | 0.07 |
| Manganese | 0.15 |
| Phosphorus | 0.02 |
| Sulfur | 0.015 |
| Iron | balance |

*Example 6*

| | |
|---|---|
| Carbon | 0.07 |
| Silicon | 0.07 |
| Manganese | 0.15 |
| Phosphorus | 0.02 |
| Sulfur | 0.015 |
| Iron | balance |

*Example 7*

| | |
|---|---|
| Carbon | 0.08 |
| Silicon | 0.07 |
| Manganese | 0.15 |
| Phosphorus | 0.02 |
| Sulfur | 0.015 |
| Iron | balance |

*Example 8*

| | |
|---|---|
| Carbon | 0.05 |
| Silicon | 0.05 |
| Manganese | 0.2 |
| Phosphorus | 0.03 |
| Sulfur | 0.02 |
| Iron | balance |

*Example 9*

| | |
|---|---|
| Carbon | 0.05 |
| Silicon | 0.12 |
| Manganese | 0.1 |
| Phosphorus | 0.01 |
| Sulfur | 0.03 |
| Iron | balance |

*Example 10*

| | |
|---|---|
| Carbon | 0.05 |
| Silicon | 0.02 |
| Manganese | 0.18 |
| Phosphorus | 0.015 |
| Sulfur | 0.01 |
| Iron | balance |

*Example 11*

| | |
|---|---|
| Carbon | 0.05 |
| Silicon | 0.15 |
| Manganese | 0.2 |
| Phosphorus | 0.03 |
| Sulfur | 0.015 |
| Iron | balance |

The following Example 12 shows a frequently used preferred embodiment of the alloy composition in accordance with the present invention.

*Example 12*

| | Percent |
|---|---|
| Carbon | 0.05 |
| Silicon | 0.07 |
| Manganese | 0.15 |
| Phosphorus | 0.02 |
| Sulfur | 0.015 |
| Iron | balance |

The parts of the operating device which may come in contact with the magnetic fluid such as the wall means of the chamber containing the magnetic fluid, parts projecting into the chamber or operating members projecting into the chamber, are preferably made in accordance with the present invention of low carbon iron, aluminum, copper or similar materials which guarantee that no substances such as for instance graphite will be released which may impair the purity of the magnetic fluid required by the present invention. For the same reason the present invention provides for the magnetic fluid and the parts of the operating device which may come in contact with the magnetic fluid, especially the magnetically active parts, to be of different hardness.

This being the case the action of the magnetic fluid on the surfaces of the operating device with which it comes in contact, will result in the smallest possible amount of abrasion and actually no appreciable quantities of abrasion particles will get mixed in with the magnetic fluid in the course of operation.

Particle size and composition of the magnetic fluid individually influence the magnetic characteristics as well as the useful life span of the magnetic fluid. However, these individual qualities combined do not act in an additive way but in such manner that an optimum of desirable characteristics, such as effectiveness, workability and permanence not susceptible to changes due to aging, is achieved.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a cross section through an operating device containing a magnetic fluid according to the present invention.

Referring now to the drawing, a magnetic fluid consisting of a mass of spherical particles 1 having a diameter of 0.3 mm. and a composition of 99.695% iron, 0.05% carbon, 0.07% silicon, 0.15% manganese, 0.02% phosphorus and 0.015% sulfur is shown within a chamber 2 of a clutch device 3. The walls 4 of the chamber 2 and members 6 and 7 projecting into said chamber are made of iron and have a hardness which differs from the hardness of the particles 1 of the magnetic fluid.

When no magnetic force is applied to the magnetic fluid, the fluid is free flowing and the particles of the fluid do not interfere with the movements of the clutch members 6 and 7 relative to each other. Upon application of magnetic force, and in direct relation to the amount of said force, the particles of the magnetic fluid lose their free flowability and upon application of sufficiently strong magnetic forces these particles become a rigid structure. It can readily be seen that when these particles become a rigid structure the magnetic fluid will prevent any movement of members 6 and 7 relative to each other. Upon exertion of lesser magnetic forces than those required to transform the magnetic fluid into a completely rigid structure the magnetic fluid will hinder and retard but not completely prevent the movement of members 6 and 7 relative to each other. The action of the magnetic fluid in this respect is in direct relationship to the amount of magnetic force which is applied and consequently can be controlled by controlling the amount of the magnetic force.

It will be understood that each of the elements described above, or two or more together, may also find a useful application in other types of magnetic fluids differing from the types described above.

While the invention has been illustrated and described as embodied in an operating device containing a magnetic fluid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a clutch-type device, in combination, a magnetic fluid consisting essentially of a mass of substantially spherical free flowing solid particles having a diameter of approximately 0.3 mm. and containing approximately 99.7% pure magnetizable iron and approximately 0.05% carbon, 0.07% silicon, 0.15% manganese, 0.02% phosphorus, 0.015% sulfur, being substantially free of nitrogen, and also being substantially free of non-magnetizable substances; two clutch members movable relative to each other; wall means constituting part of one of said clutch members and forming a chamber containing said magnetic fluid; and a clutching projection arranged on the other of said clutch members and projecting into said chamber, said wall means and said clutching projection consisting of a ferrous material having a low carbon content and having a hardness different from the hardness of said particles said ferrous material being incapable of releasing substances adapted to reduce the magnetizability and flowability of said magnetic mass.

References Cited in the file of this patent

UNITED STATES PATENTS

| | | |
|---|---|---|
| 2,538,992 | Trask | Jan. 23, 1951 |
| 2,631,705 | Winther | Mar. 17, 1953 |
| 2,695,675 | Frye | Nov. 30, 1954 |
| 2,705,064 | Lear | Mar. 29, 1955 |
| 2,733,792 | Saxl | Feb. 7, 1956 |

OTHER REFERENCES

Aspects of Magnetic Fluids, Ordnance vol. 34–35, pages 354–356. Published March–April 1950.

Goetzel: Treatise on Powder Metallurgy, vol II, page 358, Interscience Publishers, Inc., N. Y., 1950.